H. T. NOBLE.
Caster-Colter.

No. 214,519. Patented April 22, 1879.

Witnesses:
H. F. Binns.
O. W. Bond.

Inventor:
Henry T. Noble.
By West & Bond Attys

UNITED STATES PATENT OFFICE

HENRY T. NOBLE, OF DIXON, ILLINOIS.

IMPROVEMENT IN CASTER-COLTERS.

Specification forming part of Letters Patent No. 214,519, dated April 22, 1879; application filed September 14, 1878.

*To all whom it may concern:*

Be it known that I, HENRY T. NOBLE, of Dixon, Lee county, State of Illinois, have invented a new and useful Improvement in Caster-Colters, of which the following is a full description, reference being had to the accompanying drawings, in which—

Figure 1:
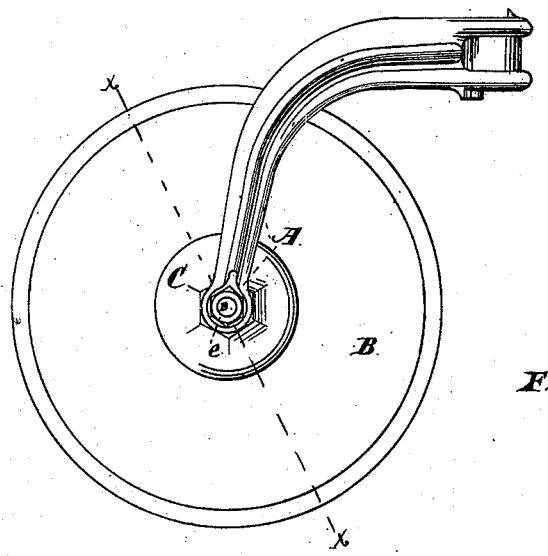
Figure 2:
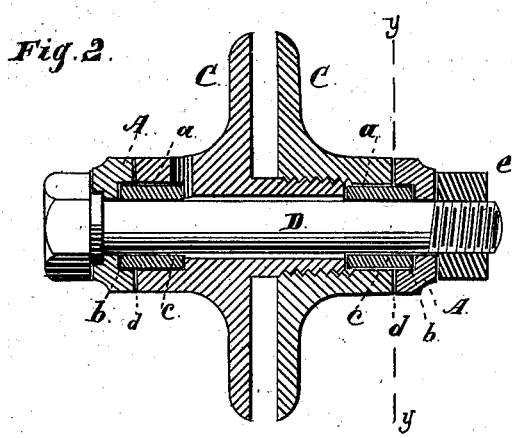
Figure 3:
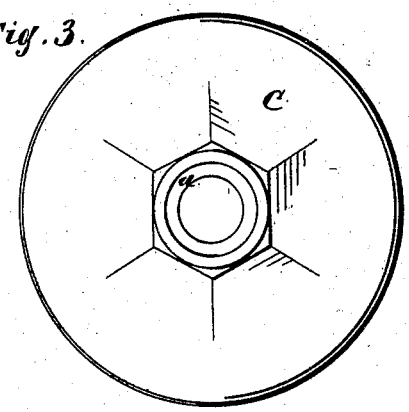

Figure 1 is a side elevation; Fig. 2, a section at line $x$ of Fig. 1; Fig. 3, an end elevation of the hub, taken at line $y$, Fig. 2, the washer being removed.

The leading objects of my invention are to exclude sand and dirt from the interior of the colter-hub and prevent rapid wear of the bolt which secures the hub in the arms of the yoke, which I accomplish by providing the ends of the hub, and also the arms of the yoke which receive the bolt, with countersinks, in which washers are inserted, as more fully hereinafter set forth.

In the drawings, A represents the arms of the colter-yoke; B, the colter-wheel; C C, the two parts of the hub between which the wheel B is secured. As shown, these two parts C C are screwed one upon the other. (See Fig. 2.)

In each end of the hub is a countersink, $a$, and in each arm A, on the inside, is a countersink, $b$; and $c$ is a washer inserted in the countersinks $a\ b$. D is a bolt passing through the arms A, washers $c$, and hub. The opening through the central portion of the hub is somewhat larger than the bolt.

The washers $c$, it will be seen, extend each side of the joints $d$, between the ends of the hub and the arms of the yoke, and effectually exclude sand and dirt from the interior of the hub; and as they can rotate in the recesses, while the bolt D can also rotate in the washers and does not come in contact with the hub, the interior of the hub will not be worn in use, and the bolt will not wear rapidly. If the bolt or washer, or both of them, become worn so as to interfere with the operation of the colter, they can be removed and replaced with trifling expense, the hub and arms remaining unworn for a long time.

The bolt is held in place by a nut, $e$, and if there is any wear between the ends of the hub and the faces of the arms the bolt can be tightened, as the arms will spring sufficiently for this purpose.

I am aware that colter-hubs have been made tapering at their ends and provided with washers extending over such ends; and I do not claim, broadly, the use of washers with a colter-hub; but What I do claim, and desire to secure by Letters Patent, is as follows:

A colter-hub provided with countersinks $a$ and the yoke-arms A A, provided with countersinks $b$, in combination with washers $c$, inserted in said countersinks and extending on both sides of the joints, and bolt D, substantially as and for the purposes set forth.

HENRY T. NOBLE.

Witnesses:
JOHN V. THOMAS,
ORRIN B. DODGE.